(12) United States Patent
Ravid

(10) Patent No.: US 6,816,982 B2
(45) Date of Patent: Nov. 9, 2004

(54) METHOD OF AND APPARATUS FOR COMPUTER HARD DISK DRIVE PROTECTION AND RECOVERY

(76) Inventor: Gonen Ravid, 29429 Cresthaven Ct., Agoura Hills, CA (US) 91301

( * ) Notice: Subject to any disclaimer, the term of this patent is extended or adjusted under 35 U.S.C. 154(b) by 449 days.

(21) Appl. No.: 09/805,705

(22) Filed: Mar. 13, 2001

(65) Prior Publication Data

US 2002/0133747 A1 Sep. 19, 2002

(51) Int. Cl.[7] ............................................. G06F 11/00
(52) U.S. Cl. .............................. 714/20; 711/133; 714/7
(58) Field of Search ............................ 714/20, 13, 6, 714/7, 25, 27, 42, 43, 47, 8; 711/133, 159

(56) References Cited

U.S. PATENT DOCUMENTS

| | | | |
|---|---|---|---|
| 5,077,736 A | * 12/1991 | Dunphy et al. ................. | 714/7 |
| 5,155,845 A | 10/1992 | Beal et al. | |
| 5,159,671 A | * 10/1992 | Iwami .......................... | 710/20 |
| 5,321,826 A | * 6/1994 | Ushiro ......................... | 711/162 |
| 5,333,301 A | 7/1994 | Cheney et al. | |
| 5,406,450 A | 4/1995 | Shieh | |
| 5,469,453 A | * 11/1995 | Glider et al. ................... | 714/6 |
| 5,475,697 A | * 12/1995 | Katz et al. .................... | 711/159 |
| 5,758,057 A | * 5/1998 | Baba et al. ..................... | 714/7 |
| 5,777,811 A | 7/1998 | Bodo | |
| 5,894,551 A | 4/1999 | Huggins et al. | |
| 5,928,341 A | 7/1999 | Liang | |
| 6,067,618 A | 5/2000 | Weber | |
| 6,418,508 B1 | * 7/2002 | Saito ........................... | 711/112 |
| 6,542,954 B1 | * 4/2003 | Aruga .......................... | 710/316 |
| 6,598,174 B1 | * 7/2003 | Parks et al. .................... | 714/6 |

FOREIGN PATENT DOCUMENTS

WO    WO 01/02936 A1    1/2001

* cited by examiner

Primary Examiner—Nadeem Iqbal
(74) Attorney, Agent, or Firm—Thomas I. Rozsa; Tony D. Chen

(57) ABSTRACT

A method of and apparatus for computer hard disk drive (HDD) protection and recovery. The apparatus includes a HDD controller board and a back-up HDD, both installed in a computer system having a working HDD. The apparatus utilizes hardware switches electrically coupled to the controller board, including a HDD selection switch and a copy command button. During normal operations, the switch remains switched to the working HDD, and as a result, the back-up HDD is switched off and remains transparent to the computer system and therefore protected from software viruses and other intrusions. The method includes a first-time image back-up process. When there is a failure of the working HDD, the back-up HDD can be instantly used as a normal HDD by switching the switch to the back-up HDD, so the computer system can be up and running without any interruption. Once the working HDD is fixed or replaced, all contents on the back-up HDD can be copied back to the working HDD by simply press the copy button while the Switch is switched to the back-up HDD, to restore the working HDD. Upon completion of this recovery process, the switch can be switched back to the working HDD, which allows the working HDD to be used as a normal working HDD again.

25 Claims, 9 Drawing Sheets

METHOD OF AND APPARATUS FOR COMPUTER HARD DISK DRIVE PROTECTION AND RECOVERY

BACKGROUND OF THE INVENTION

1. Field of the Invention

The present invention relates generally to the field of computer hardware and software technologies and more particularly related to computer hard disk drive back-up and recovery systems.

2. Description of the Prior Art

One of the significant problems many computer users are facing today is the loss of time and loss of data due to computer hard disk drive (HDD) failure. The majority of HDD failures are caused by HDD corruption, which in turn may be caused by HDD over-full, viruses intrusion, human error in HDD configuration, mistakes or incompatibility in new software installation, or electrical or mechanical malfunction. When a HDD failure occurs, there is often no back-up system which can be used to restore and recover the HDD. In addition, it is often very difficult and time consuming to recover the computer software operating system (OS) on the computer and restore all the data. For example, even with an existing back-up system, the user often must rebuild the OS on the drive before the data can be restored. Rebuilding the OS on a HDD can take up to an hour, and restoring all contents on a HDD can take anywhere from 1 to 8 hours depending on the size of the HDD. This long down time is often unacceptable as today's computer systems must be operational all the time to avoid the loss of revenue and customer good will.

Many efforts have been made to design and develop methods and system for protection of the operating system (OS) and important data on a HDD from virus intrusion and other attacks, and for quick recovery of the contents of a HDD in case of a failure. The following eight (8) references are believed to be pertinent to this field of art:

1. U.S. Pat. No. 5,155,845 issued to Beal et al. on Oct. 13, 1992 for "Data Storage System For Providing Redundant Copies Of Data On Different Disk Drives" (hereafter "Beal");
2. U.S. Pat. No. 5,333,301 issued to Cheney et al. on Jul. 26, 1994 for "Data Transfer Bus System And Method Serving Multiple Parallel Asynchronous Units" (hereafter "Cheney");
3. U.S. Pat. No. 5,406,450 issued to Shieh on Apr. 11, 1995 for "Portable Hard Disk Drive Connector With A Parallel (Printer) Port Control Board" (hereafter "Shieh");
4. U.S. Pat. No. 5,777,811 issued to Bodo on Jul. 7, 1998 for "Digital Data Duplicating System" (hereafter "Bodo");
5. U.S. Pat. No. 5,894,551 issued to Huggins et al. on Apr. 13, 1999 for "Single Computer System Having Multiple Security Levels" (hereafter "Huggins");
6. U.S. Pat. No. 5,928,341 issued to Liang on Jul. 27, 1999 for "Dynamic Printer-Port Switcher For Selectively Connecting At Least Two Peripheral Devices To A PC Having A Printer Port" (hereafter "Liang");
7. U.S. Pat. No. 6,067,618 issued to Weber on May 23, 2000 for "Multiple Operating System And Disparate User Mass Storage Resource Separation For A Computer System" (hereafter "Weber"); and
8. WIPO International Publication No. WO 01/02936 A1 for PCT Application by Peterson for "Computer Security System with Dedicated Hard Drives" (hereafter "Peterson").

Beal disclosed a disk storage system that writes multiple copies of records directed to user-specified volumes. The system includes a multiplicity of control units interconnected by direct data links, and a multiplicity of corresponding sets of recording means communicate over the direct data links when a write request is received by one control unit to cause one volume in each set of recording means to write a copy of the received record.

Cheney disclosed a system and method for transferring data between a single channel unit and multiple asynchronous storage devices. The system utilizes read strobe signals to indicate when the storage devices will send data over a data bus, and initiate a validity count-down which in turn indicates when the data on the data bus is valid, as the data on the data bus is sampled when the count-down has completed. The system may further includes means for checking the data for array parity errors while the data is sent and received to and from the storage devices.

Shieh disclosed a portable hard disk connector with a parallel/printer port control board. The connector includes a case which has an upper cover and a lower cover engaged with the upper cover. The control board is fixedly fitted in the lower cover and has a parallel/printer port interface input connector, a parallel/printer port output connector, and two hard disk drive connectors. The connectors are partly protruding out of the case. A switch is mounted on the control board and partly protruding out of the case. There is also a female connector for connecting a hard disk drive connected with the rear side of case. A 1.8" hard disk drive can be fitted in the case and connected with the female connector. Furthermore, the hard disk drive connectors can be externally connected with one to two hard disk drives as desired. The switch is used for adjusting the principal and secondary relationship between the hard disk drives when the connector is connected with an external hard disk drive.

Bodo disclosed a data-duplicating system for copying digital data between information storage device that occupies a mounting space sized to receive a standard 5 ¼ inch, half-height hard disk drive. The system includes different types of information-storage-device connectors adapted for coupling to the data-duplicating system information storage devices that conform to various disparate, incompatible interface specifications. The electronic circuit of the system includes a digital logic circuit for reading digital data from a first information storage device and writing the read digital data to one or more other information storage devices. It utilizes a high-speed serial-port which permits coupling together a pair of data-duplicating systems. It also has a plurality of switches and a liquid crystal display for an operator to control the system.

Huggins disclosed a single computer system with multiple security levels which allows a user to switch between two or more networks without transferring data between the networks. The single computer system is a standard computer which includes a central processing unit (CPU) coupled to a random access memory (RAM), a power supply and a reset switch. The computer is coupled to two or more network cards, where each of the cards is in turn connected to a separate storage device such as a hard disk drive. Each combination of a network card connected to a storage device constitutes a local network. As in a standard computer, activating the reset switch reboots the CPU and clears the RAM. A user can choose between the local networks by using a selection switch which may be a rotary switch, a rocker switch, or a push button switch, which activates one of the local networks or the reset switch. The selection switch is constructed so that it is impossible to switch between two local networks without first activating the reset switch, thereby preventing data from being transferred between the local networks. By preventing the transfer of data between the local networks, each network can have a different level of security.

Liang disclosed a dynamic printer-port switcher (DPS) for selectively connecting, through software control, two or more peripheral devices to a personal computer (PC) having a printer port. The DPS includes a printer-port connector for connecting the DPS to a printer port on the PC, two or more peripheral connectors for connecting the DPS to multiple peripheral devices, such as printers, PC cameras, scanners, external CD-ROM drives, and external hard disk drives. The DPS also includes two or more switching circuits which are under control by a control circuit to selectively connect the PC to one of the connected peripheral devices.

Weber disclosed an apparatus for providing multiple operating system and hard disk drive separation on a single computer. The computer system can have several nonconcurrently active hard disk drives each ordinarily loaded with unique software bundles. Each active hard drive, when selected, can introduce an especial operating system setup and applications installation, and other hard disk drives are unconditionally denied access by activities obtained under the selected hard disk drive's software instructions. The apparatus isolates two or more user's application programs and data files, while allowing the hard disk drives to share common computer system hardware and peripherals. As a result, each hard disk drive and the operating system stored thereon can be used independently.

Peterson disclosed a computer security system with two dedicated hard disk drives, where one hard drive may be used for the Internet and communication software and the other may be used for private and confidential information. A user may select and access a particular hard disk drive while the other hard disk drive is not selected.

While many of the above cited references have described various methods and systems for handling and operating multiple HDDs, there is a need for providing a simple and reliable method and apparatus for quick back-up of the OS and data on a working HDD to a back-up HDD, constant protection of the back-up HDD during normal operation of the working HDD, and one-step quick recovery of the OS and data in case of a failure in the working HDD.

SUMMARY OF THE INVENTION

The present invention is directed to a method of and apparatus for computer hard disk drive (HDD) protection and recovery.

In one of the preferred embodiments of the present invention, the HDD protection and recovery apparatus utilizes a HDD controller board installed between a computer system and two HDDs, where the first HDD is a normal operating or working HDD (hereafter referred to as "HDD A"), and the second HDD is used for back-up and recover purposes (hereafter referred to as "HDD B"). The HDD protection and recovery apparatus also utilizes hardware switches electrically coupled to the controller board, including a HDD selection switch used for selecting either HDD A or HDD B (hereafter referred to as "A-B Switch") and a copy command button used for one-step copying between the HDDs (hereafter referred to as the "Copy Button").

When the present invention HDD protection and recovery apparatus is initially installed into the computer system, the first step is to switch the A-B switch to HDD A, and then press the Copy Button. This will initiate the first-time image back-up process which copies all the contents on HDD A to HDD B, thereby creates an image back-up of HDD A in HDD B.

The next step is that for normal operation of the computer system, the A-B Switch remains switched to HDD A, and as a result, HDD B is switched off and remains transparent to the computer system. Since the A-B switch is a hardware switch, the non-selected HDD is isolated from the normal operating system on the computer and therefore, is protected from software viruses and other intrusions.

When there is a failure of HDD A, with a simple flip of the A-B Switch from HDD A to HDD B, HDD B can be instantly used as a normal working hard disk drive with the computer system and the system can be up and running without interruption from the failure of HDD A.

Once HDD A is fixed or replaced, all contents on HDD B can be copied back to HDD A by simply press the Copy Button while the A-B Switch is left at HDD B selection, to restore HDD A such that all contents are recovered. Once this recovery process is completed, the A-B Switch can be switched back to HDD A, which allows HDD A to be used as a normal working HDD again.

In a basic embodiment of the present invention, the HDD controller board may be controlled by special computer software installed and running on the computer system.

In an alternative embodiment of the present invention, the HDD controller board may include a hardware sequencer that accelerates the copying process.

In a further alternative embodiment of the present invention, the HDD controller board may include its own central processing unit (CPU) which runs the special computer software program for controlling the HDD controller board to perform data duplication process.

In still another embodiment of your invention, drive A and drive B may be logical drives on the same HDD.

In still another embodiment of your invention, the control logics may be embedded on electronic chips or circuits on the motherboard of the computer system.

In still another embodiment of your invention, the control logics may be embedded on electronic chips or circuits on the primary HDD A or on the added second HDD B.

One important novel and unique feature of the present invention is the use of a hardware switch which shields the HDD B from software viruses that may invade on the working HDD A. Another important novel and unique feature of the present invention is the one-step copying process between the HDDs which allows instant back-up and instant recovery when there is a failure in the working HDD A. An important advantage of the present invention arrangement is that after the initial imaging process which copies all contents of the working HDD A to the added second HDD B, the copied contents on the second HDD B can be immediately checked and verified by switching the A-B Switch to HDD B and running the computer system with HDD B.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
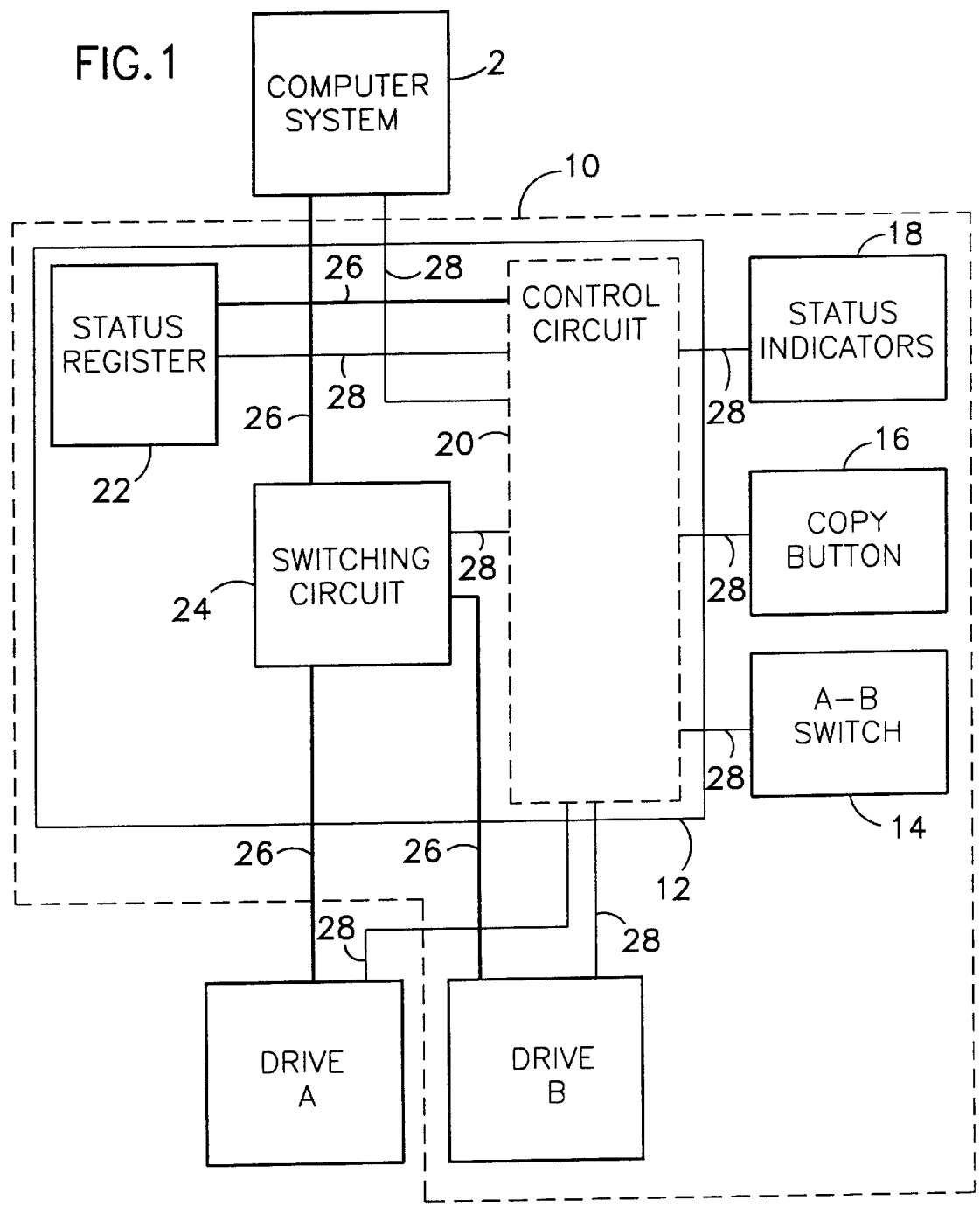
FIG. 1 is an illustrative block diagram showing one embodiment of the present invention apparatus for computer hard disk drive (HDD) protection and recovery.

Referring to FIG. 1, there is shown one embodiment of the present invention apparatus for computer hard disk drive (HDD) protection and recovery apparatus. As shown in FIG. 1, the present invention HDD protection and recovery apparatus 10 is connected between a computer system 2 and its HDD A which can be either a single or an array of normal operating working HDDs of the computer system 2. The present invention HDD protection and recovery apparatus 10 includes a controller board 12, a second HDD B which is the back up HDD. Apparatus 10 also includes hardware switch 14 for selecting between HDD A and HDD B (hereafter the "A-B Switch"), and a press-button 16 for initiate the one-step copying of the contents between HDD A and HDD B (hereafter the "Copy Button"). Apparatus 10 may also include visual and/or audible status indicators 18.

In one embodiment of the present invention, the controller board 12 has a control circuit 20, a status register 22 and a switching circuit 24. The computer system 2, the control circuit 20, the status register 22 and the switching circuit 24 of controller board 10, and HDDs A and B are electronically and/or electrically connected by data lines 26 as indicated in FIG. 1. The computer system 2, the control circuit 20, the status register 22 and the switching circuit 24 of controller board 10, A-B Switch 14, Copy Button 16, status indicators 18, and HDDs A and B are also electronically and/or electrically connected by control lines 28 as indicated in FIG. 1.

Hardware A-B Switch 14 has two positions: A and B. When A-B Switch 14 is switched to the "A" position, then HDD A is selected. Alternatively, when A-B Switch 14 is switched to the "B" position, then HDD B is selected. When HDD B is not selected, it can be read only (usually by special software), and remains "invisible" to the operating system (OS).

When Copy Button 16 is pressed, it initiates an imaging process which copies the content of the selected HDD to the non-selected HDD. For example, when A-B Switch 14 is switched to "A", pressing Copy Button 16 will initiate process wherein the contents of HDD A are copied to HDD B. This imaging process may be executed by a special software running on the computer system 2. Alternatively, it can be done by firmware on controller board 12. It is noted that this initial imaging process may be performed in other ways, for example, by using a special HDD duplication system and/or software.

The basic functions of the controller board 10 include detecting the A-B Switch 14 and Copy Button 16 and switching between HDDs A and B depending on the A-B Switch 14 selection. The controller board 10 may be controlled by a special software program running on the computer system 2 which can access HDD B on a read-only basis for the purpose of selective and/or incremental backup. It also provides status information to the software through status register 22 and optionally to the user through status indicators 18.

Figure 2:
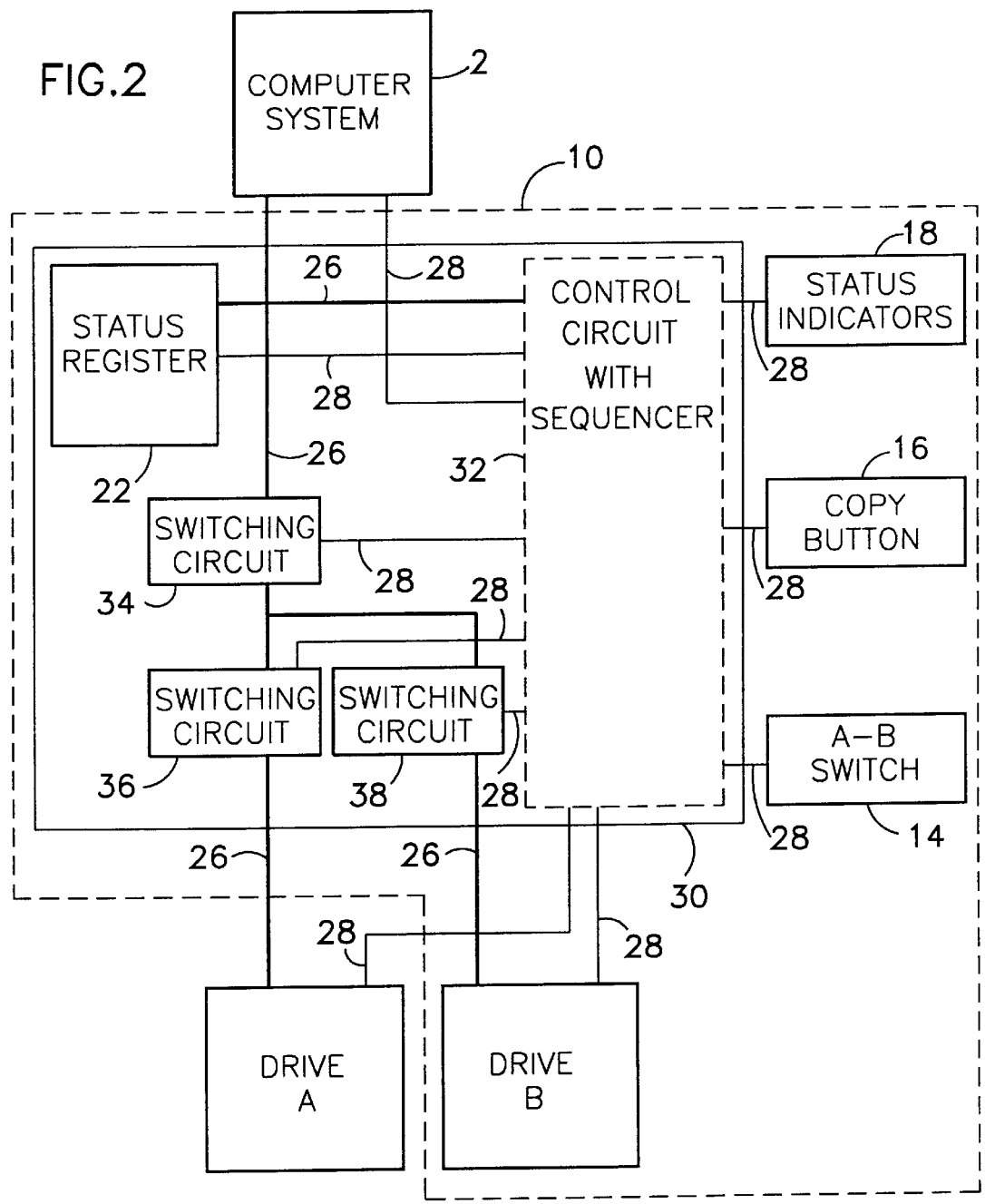
FIG. 2 is an illustrative block diagram showing another embodiment of the present invention apparatus for computer hard disk drive (HDD) protection and recovery.

Referring to FIG. 2, there is shown an alternative embodiment of the present invention. The controller board 30 now has a control circuit with a sequencer 32, and switching circuits 34, 36 and 38, all electronically and/or electrically connected by data lines 26 and/or control lines 28 as indicated in FIG. 2, which are utilized to accelerate the copying process.

Figure 3:
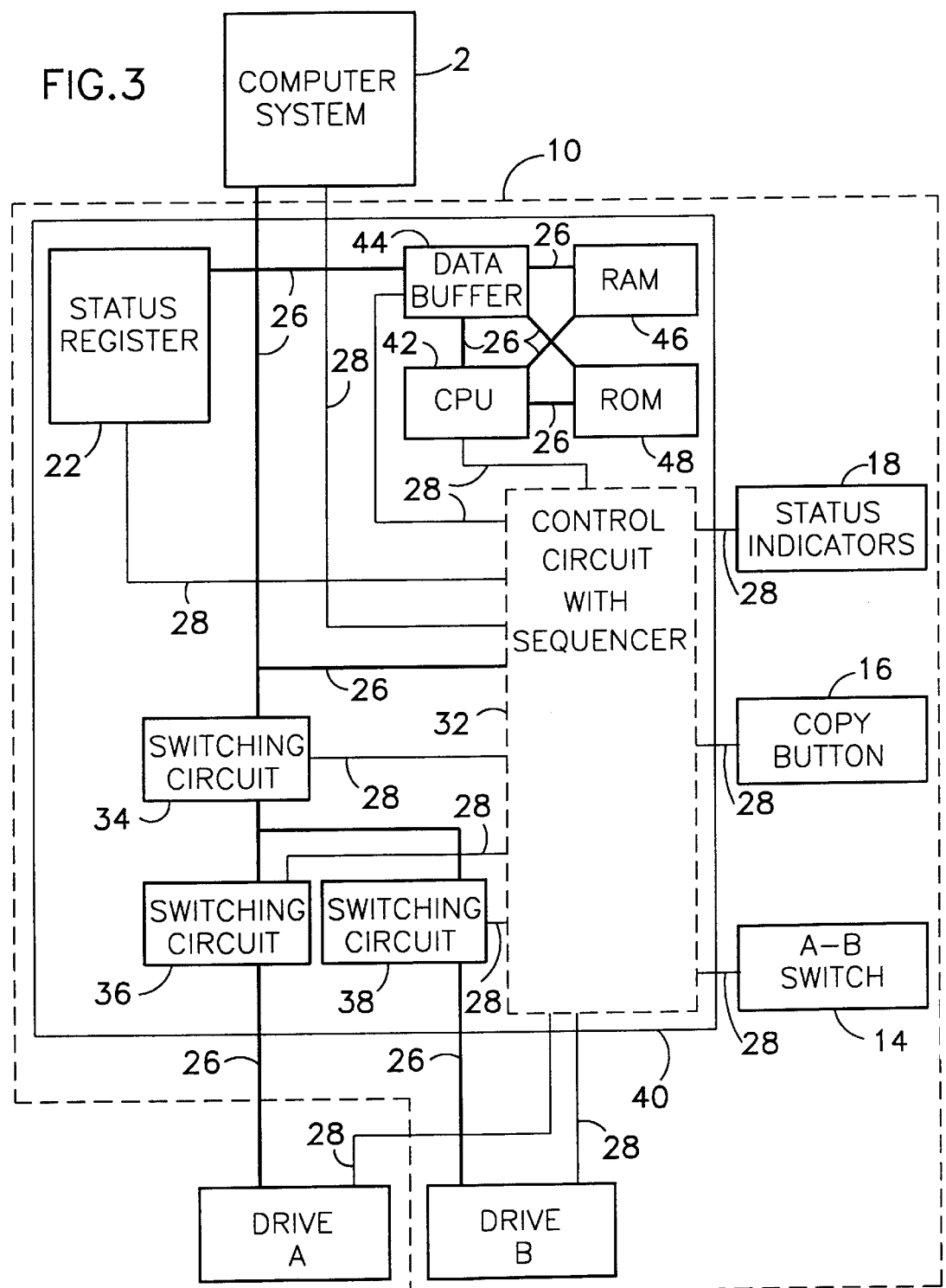
FIG. 3 is an illustrative block diagram showing still another embodiment of the present invention apparatus for computer hard disk drive (HDD) protection and recovery.

Referring to FIG. 3, there is shown another alternative embodiment of the present invention. The controller board 40 now has an on-board central processing unit (CPU) 42, a data buffer 44, a random access memory 46 and a read-only memory 48, all electronically and/or electrically connected by data lines 26 and/or control lines 28 as indicated in FIG. 3, which allows the copying process to be controlled by the on-board CPU 42 without the need of running a special software on the computer system 2.

Figure 4:
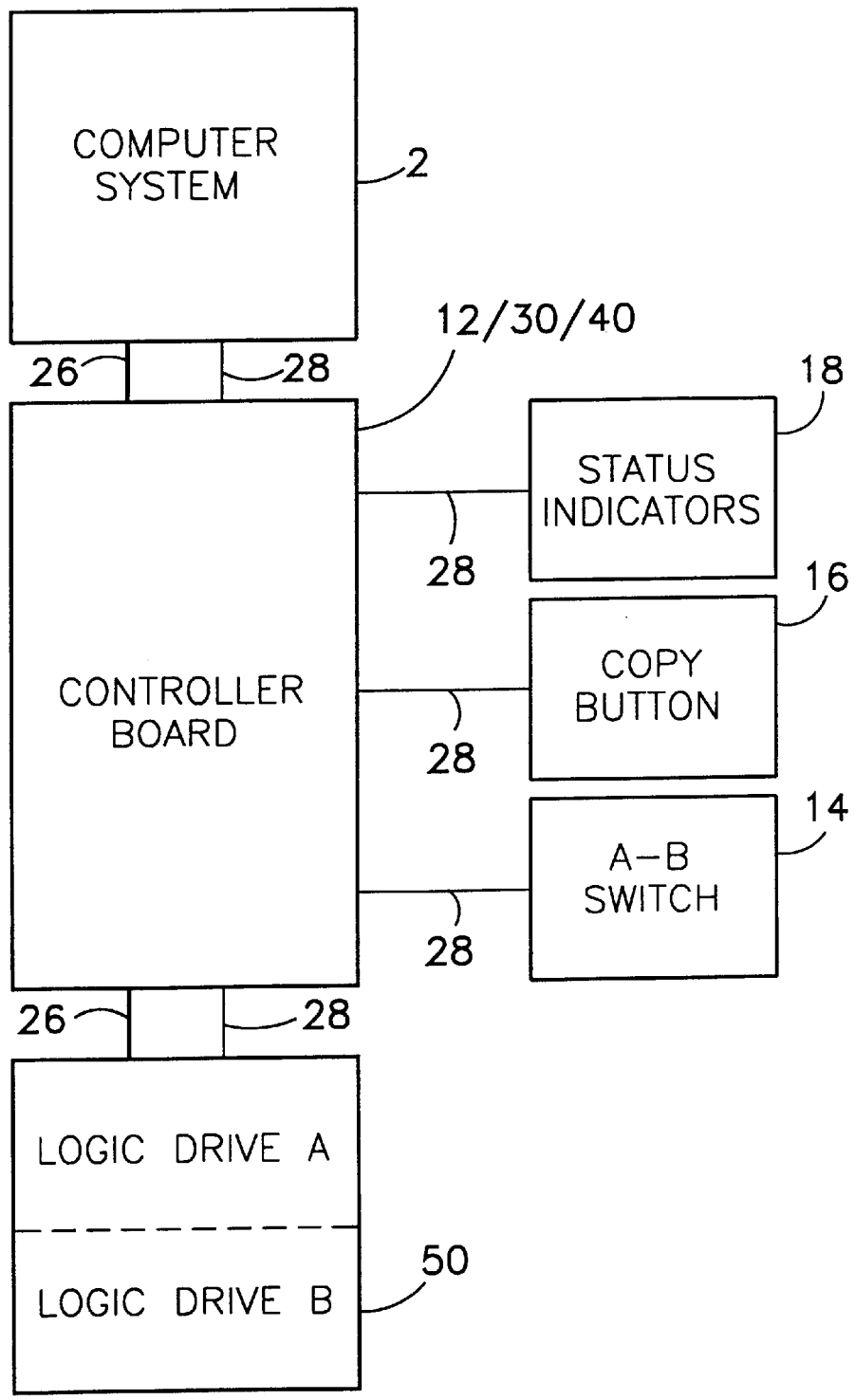
FIG. 4 is an illustrative block diagram showing still another embodiment of the present invention apparatus for computer hard disk drive (HDD) protection and recovery.

Referring to FIG. 4, there is shown still another alternative embodiment of the present invention. The HDDs A and B now are logic drives (partitions) A and B, respectively, of a single HDD 50.

Figure 5:
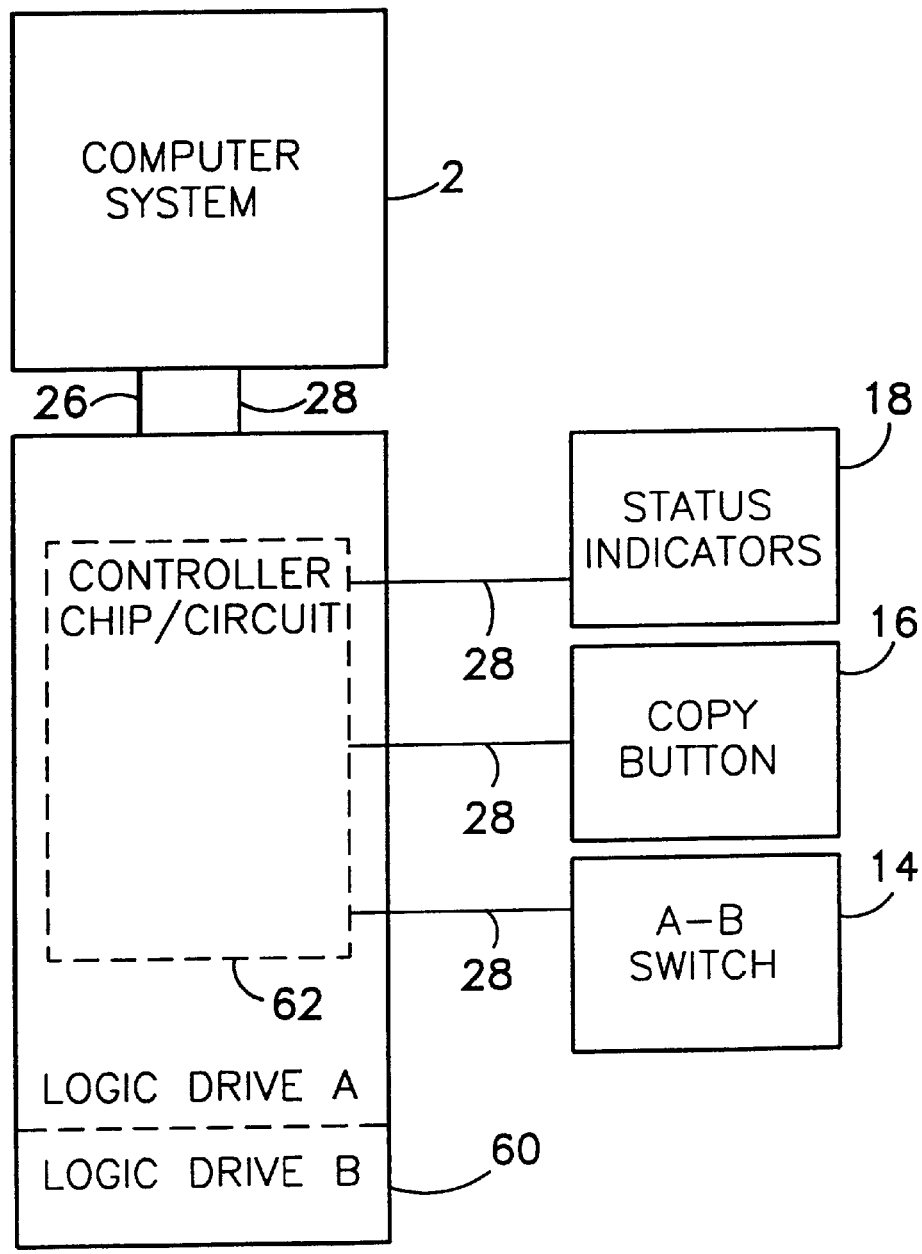
FIG. 5 is an illustrative block diagram showing still another embodiment of the present invention apparatus for computer hard disk drive (HDD) protection and recovery.

Referring to FIG. 5, there is shown still another alternative embodiment of the present invention. The control electronics are embedded in a HDD 60 as the controller chip or circuit 62 which performs all the functions of the controller board as discussed above, including detecting A-B Switch 14 and Copy Button 16, switching between the logical drives, and providing status information. A special connector on the drive may be used to connect the switch, button and the optional indicators. As an option, these connections may be wireless connections.

Figure 6:
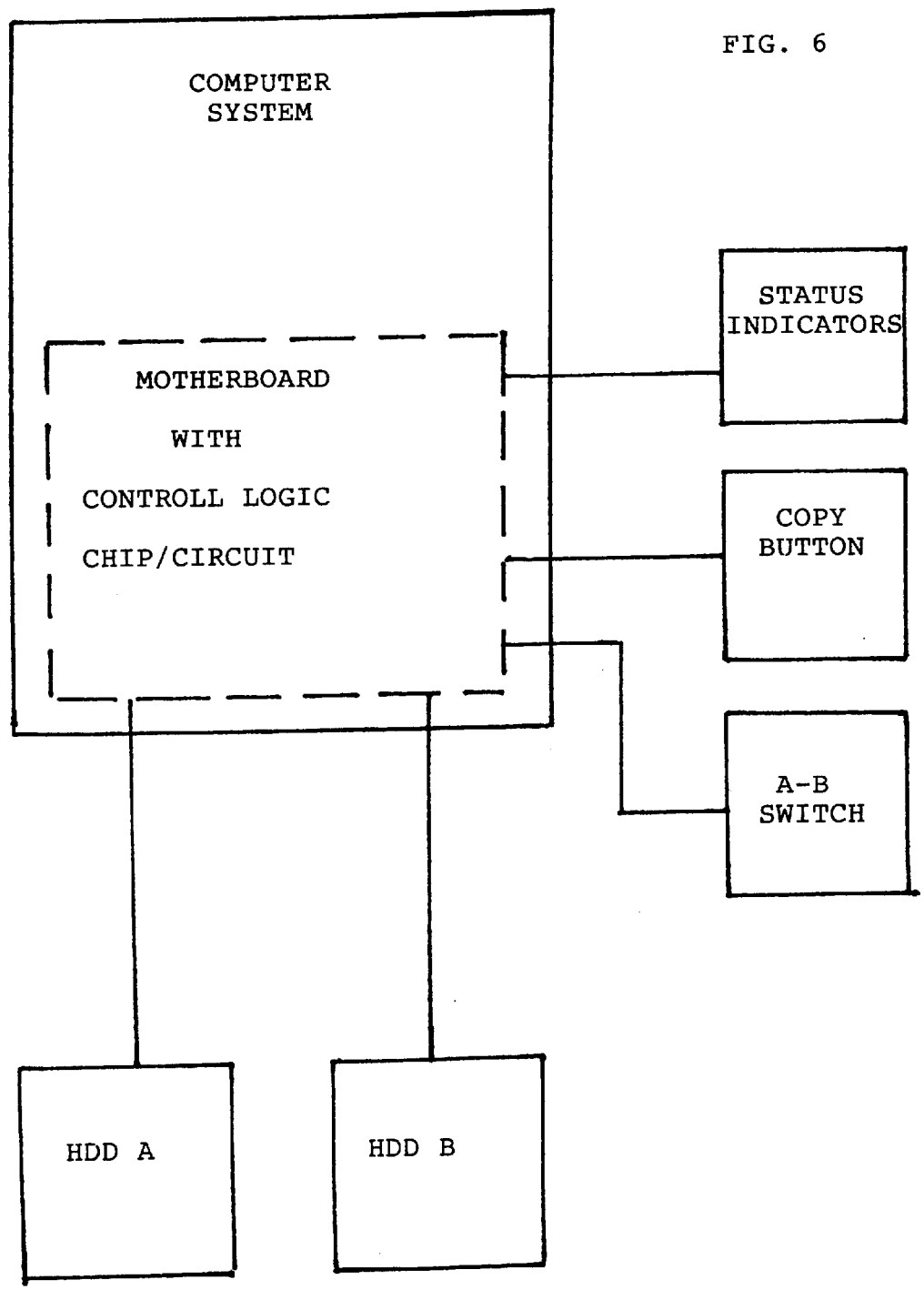
FIG. 6 is an illustrative block diagram showing still another embodiment of the present invention apparatus for computer hard disk drive (HDD) protection and recovery.

Referring to FIG. 6, there is shown still another alternative embodiment of the present invention. As shown in FIG. 6, the control electronics may embedded on the motherboard of the computer system, which performs all the functions of the controller board as discussed above, including detecting A-B Switch and Copy Button, switching between the HDDs or logical drives, and providing status information.

Figure 7:
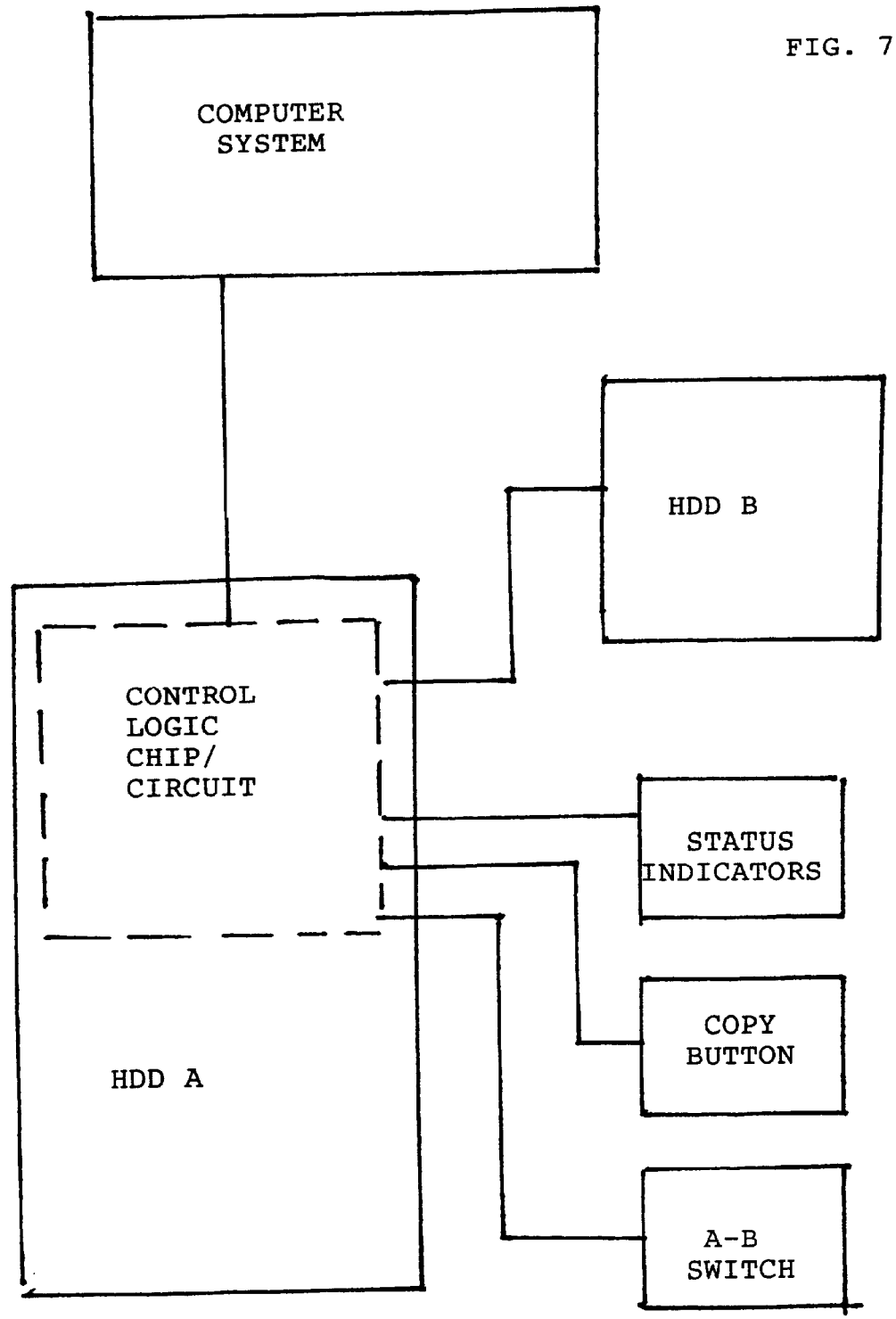
FIG. 7 is an illustrative block diagram showing still another embodiment of the present invention apparatus for computer hard disk drive (HDD) protection and recovery.
Figure 8:
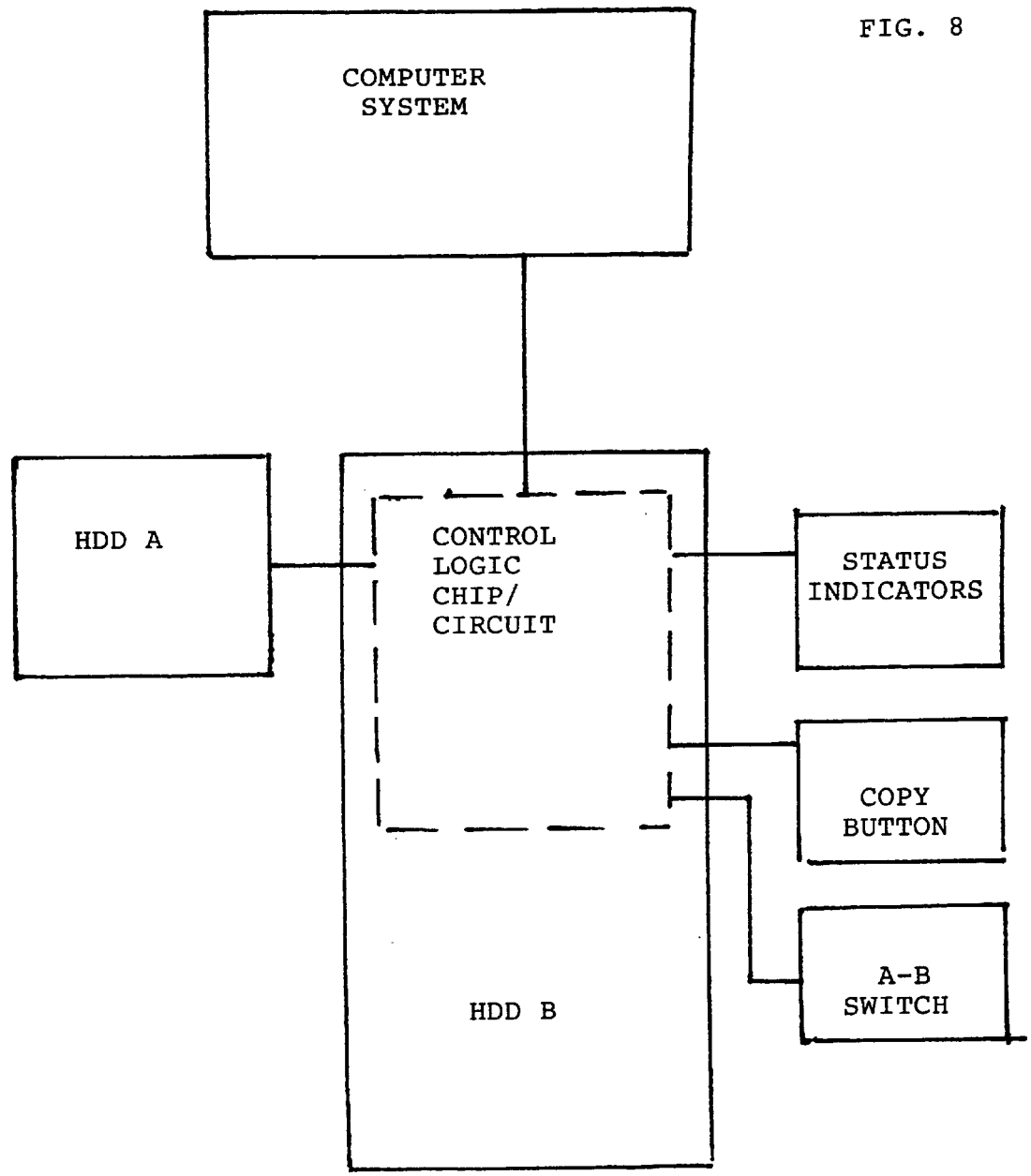
FIG. 8 is an illustrative block diagram showing still another embodiment of the present invention apparatus for computer hard disk drive (HDD) protection and recovery.

Referring to FIGS. 7 and 8, there are shown still other alternative embodiments of the present invention, where the control electronics may be embedded on the normal working HDD A as shown in FIG. 7, or embedded on the added second HDD B as shown in FIG. 8.

Figure 9:
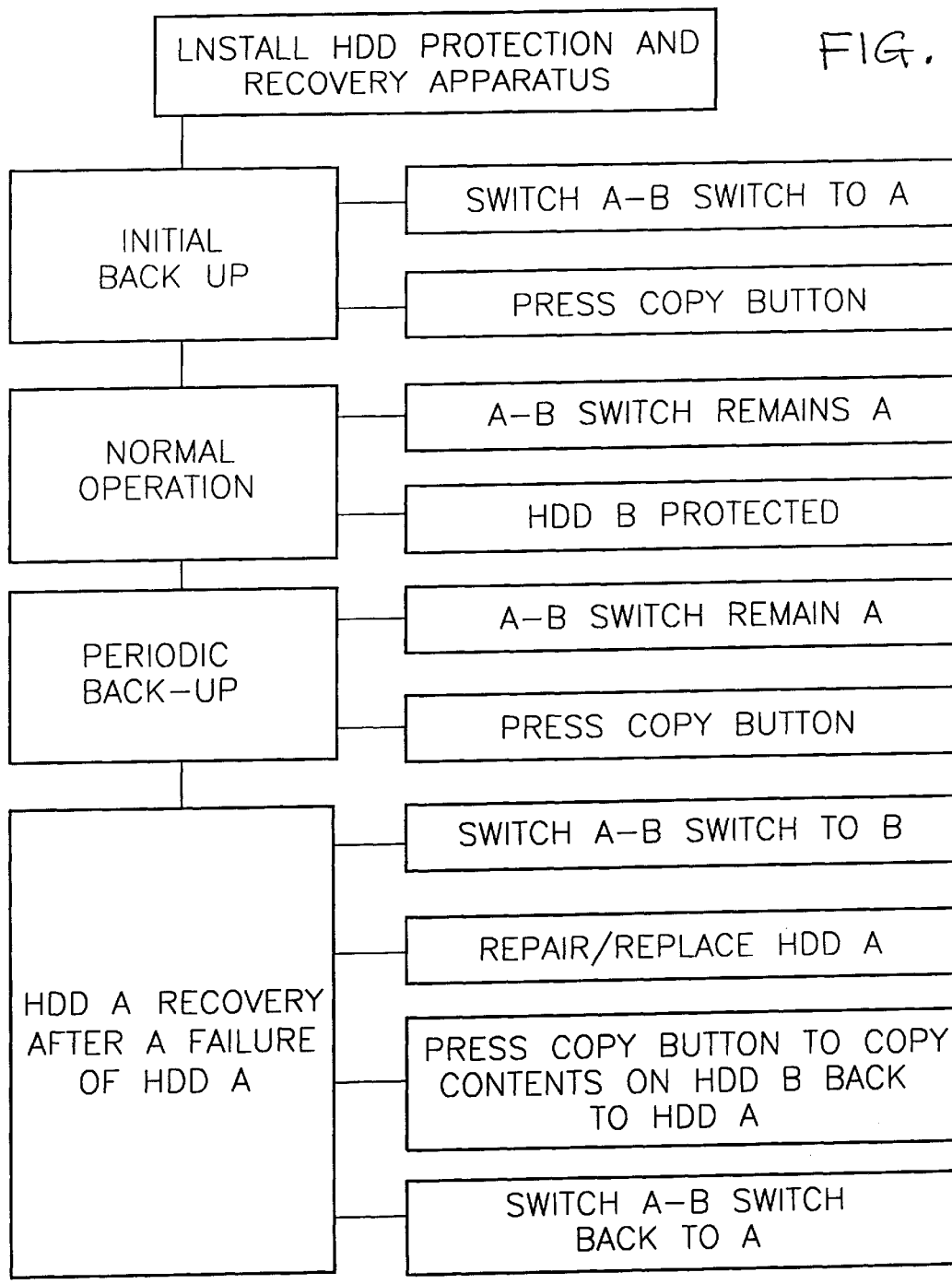
FIG. 9 is an illustrative flow chart showing an embodiment of the present invention method of computer hard disk drive (HDD) protection and recovery.

Referring to FIG. 9, there is shown the basic steps of one embodiment of the present invention method of computer hard disk drive (HDD) protection and recovery. The first step is to install the HDD protection and recovery apparatus into the computer system. Then an initial back up is created by switching the A-B switch to HDD A, and then press the Copy Button. This initiates the first-time back-up to copy all the contents on HDD A to HDD B, which creates an image back-up of HDD A in HDD B. After the initial back-up, the system can be used for normal operation, during which the A-B Switch remains switched to HDD A, and as a result, HDD B is switched off and remains transparent to the computer system, and is isolated from the normal operating system on the computer and further protected from software viruses and other intrusions. Periodic back-up can be performed by simply press Copy Button while the A-B Switch remains on A, which updates the contents on HDD B to be concurrent with HDD A. When there is a malfunction of HDD A, HDD B can be instantly used as a normal working hard disk drive with the computer system by simply switching A-B Switch from HDD A to HDD B, so that HDD A can be repaired or replaced while the system is up and running without any interruption from the failure of HDD A. Once HDD is fixed or replaced, all contents on HDD B can be copied back to HDD A by simply press the Copy Button while the A-B Switch remains at HDD B selection, to restore HDD A such that all contents are recovered.

After the completion of this recovery process, the A-B Switch can be switched back to HDD A, which allows HDD A to be used as a normal working HDD again.

The present invention method may be combined properly with incremental back-up techniques which will provide the ultimate data integrity with instant recovery. The present invention offers an integrated solution with an efficient incremental back-up scheme, which can be combined with other common or existing back-up techniques.

The present invention has many advantages. It offers a simple solution to the HDD corruption problem which can be major and costly. Once the present invention HDD protection and recovery apparatus is installed, a large 20 Gb HDD can be completely copied in less than 20 minutes. Copying a more typical drive with 5 Gb of data will only take approximately 5 minutes. This is a one-time event and does not disrupt operations, as the newly imaged HDD B becomes an alternative drive with the ability to be up and running following any failure of HDD A, with a flip of the A-B Switch. With today's low cost of HDDs and increased capacity of HDDs, HDD B can be permanently installed in the computer system to allow easy future recovery without the need for removal or re-installing of HDDs.

Another important advantage of the present invention arrangement is that the copied contents on the second HDD B can be immediately checked and verified after the initial imaging process which copies all contents of the working HDD A to the added second HDD B, by simply switching the A-B Switch to HDD B and re-boot and running the computer system with the added second HDD B with its imaged contents.

Defined in detail, the present invention is an apparatus for hard disk drive (HDD) protection and recovery, to be used in conjunction with a computer system having a working HDD, comprising: (a) a controller board installed in said computer system and electronically coupled with said working HDD; (b) a back-up HDD electronically coupled with said controlled board; (c) a hardware switch connected to said controller board and switchable between an "A" position for selecting said working HDD and a "B" position for selecting said back-up HDD; (d) said controller board having a switching circuit for controlling data transfer between said computer system and said working and back-up HDDs; (e) said controller board also having a control circuit for controlling said switching circuit, such that when said switch is switched to said "A" position, said working HDD is connected with said computer system while said back-up HDD is isolated from said computer system to protect the contents on said back-up HDD, and when said switch is switched to said "B" position after a malfunction of said working HDD, said back-up HDD is connected with said computer system and used as a substitute working HDD while said working HDD is repaired or replaced without interruption to the normal operation of said computer system; (f) said control circuit further comprising means for controlling a copy process which copies contents of a selected HDD to a non-selected HDD; and (g) a copy button also connected to said controller board for initiate said copy process, which may be performed initially after installation of said controller board and said back-up HDD to create an image back-up of all contents of said working HDD in said back-up HDD, or periodically during normal operation of said computer system to completely, incrementally or selectively update the contents of said back-up HDD such that they are concurrent with those of said working HDD, or upon completion of the repair or replacement of said working HDD after a HDD failure to restore the contents of said working HDD from said back-up HDD.

Defined alternatively, the present invention is an apparatus for hard disk drive (HDD) protection and recovery used in conjunction with a computer system having a motherboard and a working HDD, comprising: (a) control means for implementing a control logic on said motherboard of said computer system and electronically coupled with said working HDD; (b) a back-up HDD electronically coupled with said control means; (c) a hardware switch connected to said control means and switchable between an "A" position for selecting said working HDD and a "B" position for selecting said back-up HDD; (d) said control means having a switching circuit for controlling data transfer between said computer system and said working and back-up HDDs; (e) said control means also having a control circuit for controlling said switching circuit, such that when said switch is switched to said "A" position, said working HDD is connected with said computer system while said back-up HDD is isolated from said computer system to protect the contents on said back-up HDD, and when said switch is switched to said "B" position after a malfunction of said working HDD, said back-up HDD is connected with said computer system and used as a substitute working HDD while said working HDD is repaired or replaced without interruption to the normal operation of said computer system; (f) said control circuit further comprising means for controlling a copy process which copies contents of a selected HDD to a non-selected HDD; and (g) a copy button also connected to said control means for initiate said copy process, which may be performed initially after installation of said controller board and said back-up HDD to create an image back-up of all contents of said working HDD in said back-up HDD, or periodically during normal operation of said computer system to completely, incrementally or selectively update the contents of said back-up HDD such that they are concurrent with those of said working HDD, or upon completion of the repair or replacement of said working HDD after a HDD failure to restore the contents of said working HDD from said back-up HDD.

Also defined alternatively, the present invention is an apparatus for hard disk drive (HDD) protection and recovery used in conjunction with a computer system having a working HDD, comprising: (a) control means for implementing a control logic on said working HDD and electronically coupled with said computer system; (b) a back-up HDD electronically coupled with said control means; (c) a hardware switch connected to said control means and switchable between an "A" position for selecting said working HDD and a "B" position for selecting said back-up HDD; (d) said control means having a switching circuit for controlling data transfer between said computer system and said working and back-up HDDs; (e) said control means also having a control circuit for controlling said switching circuit, such that when said switch is switched to said "A" position, said working HDD is connected with said computer system while said back-up HDD is isolated from said computer system to protect the contents on said back-up HDD, and when said switch is switched to said "B" position after a malfunction of said working HDD, said back-up HDD is connected with said computer system and used as a substitute working HDD while said working HDD is repaired or replaced without interruption to the normal operation of said computer system; (f) said control circuit further comprising means for controlling a copy process which copies contents of a selected HDD to a non-selected HDD; and (g) a copy button also connected to said control means for initiate said copy process, which may be performed initially after installation of said controller board and said back-up HDD to create an image back-up of all contents of said working HDD in said back-up HDD, or periodically during normal operation of said computer system to completely, incrementally or selectively update the contents of said back-up HDD such that they are concurrent with those of said working HDD, or upon completion of the repair or replacement of said working HDD after a HDD failure to restore the contents of said working HDD from said back-up HDD.

Again defined alternatively, the present invention is an apparatus for hard disk drive (HDD) protection and recovery used in conjunction with a computer system having a working HDD, comprising: (a) a back-up HDD control means for implementing a control logic and electronically coupled with said computer system; (b) a hardware switch connected to said control means and switchable between an "A" position for selecting said working HDD and a "B" position for selecting said back-up HDD; (c) said control means having a switching circuit for controlling data transfer between said computer system and said working and back-up HDDs; (d) said control means also having a control circuit for controlling said switching circuit, such that when said switch is switched to said "A" position, said working HDD is connected with said computer system while said back-up HDD is isolated from said computer system to protect the contents on said back-up HDD, and when said switch is switched to said "B" position after a malfunction of said working HDD, said back-up HDD is connected with said computer system and used as a substitute working HDD while said working HDD is repaired or replaced without interruption to the normal operation of said computer system; (e) said control circuit further comprising means for controlling a copy process which copies contents of a selected HDD to a non-selected HDD; and (f) a copy button also connected to said control means for initiate said copy process, which may be performed initially after installation of said controller board and said back-up HDD to create an image back-up of all contents of said working HDD in said back-up HDD, or periodically during normal operation of said computer system to completely, incrementally or selectively update the contents of said back-up HDD such that they are concurrent with those of said working HDD, or upon completion of the repair or replacement of said working HDD after a HDD failure to restore the contents of said working HDD from said back-up HDD.

Further defined alternatively, the present invention is a method of hard disk drive (HDD) protection and recovery, comprising the steps of: (a) installing a controller board in a computer system which has a working HDD and electronically coupling the controller board with the working HDD; (b) installing a back-up HDD and electronically coupling the back-up HDD with said controlled board; (c) providing a hardware switch connected to said controller board and switchable between an "A" position for selecting said working HDD and a "B" position for selecting said back-up HDD, such that when said switch is switched to said "A" position, said working HDD is connected with said computer system while said back-up HDD is isolated from said computer system to protect the contents on said back-up HDD, and when said switch is switched to said "B" position after a malfunction of said working HDD, said back-up HDD is connected with said computer system and used as a substitute working HDD while said working HDD is repaired or replaced without interruption to the normal operation of said computer system; (d) providing a copy button connected to said controller board for initiating a copy process which copies contents of a selected HDD to a non-selected HDD; (e) making an initial back-up by pressing said copy button after installation of said controller board and said back-up HDD, while said switch is switched to said "A" position, to create an image back-up of all contents of said working HDD in said back-up HDD; (f) making periodic back-ups by pressing said copy button during normal operation of said computer system to completely, incrementally or selectively update the contents of said back-up HDD such that they are concurrent with those of said working HDD, (g) switching said switch to said "B" position after a malfunction of said working HDD, to connect said back-up HDD with said computer system such that it is used as a substitute working HDD while said working HDD is repaired or replaced without interruption to the normal operation of said computer system; (h) restoring the contents of said working HDD from said back-up HDD, after said working HDD is repaired or replaced, by pressing said copy button while said switch is switched to said "B" position, to completely or selectively copy the contents of said back-up HDD to said working HDD.

Alternatively defined broadly, the present invention is a method of hard disk drive (HDD) protection and recovery, comprising the steps of: (a) installing a controller board in a computer system which has a working HDD and electronically coupling the controller board with the working HDD; (b) installing a back-up HDD and electronically coupling the back-up HDD with said controlled board; (c) providing a hardware switch connected to said controller board and switchable between an "A" position for selecting said working HDD and a "B" position for selecting said back-up HDD, such that when said switch is switched to said "A" position, said working HDD is connected with said computer system while said back-up HDD is isolated from said computer system to protect the contents on said back-up HDD, and when said switch is switched to said "B" position after a malfunction of said working HDD, said back-up HDD is connected with said computer system and used as a substitute working HDD while said working HDD is repaired or replaced without interruption to the normal operation of said computer system; and (d) providing a copy button connected to said controller board for initiating a copy process which copies contents of a selected HDD to a non-selected HDD.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. An apparatus for hard disk drive (HDD) protection and recovery, to be used in conjunction with a computer system having a working HDD, comprising:
   a. a controller board installed in said computer system and electronically coupled with said working HDD;
   b. a back-up HDD electronically coupled with said controlled board;
   c. a hardware switch connected to said controller board and switchable between an "A" position for selecting said working HDD and a "B" position for selecting said back-up HDD;
   d. said controller board having a switching circuit for controlling data transfer between said computer system and said working and back-up HDDs;
   e. said controller board also having a control circuit for controlling said switching circuit, such that when said switch is switched to said "A" position, said working HDD is connected with said computer system while said back-up HDD is isolated from said computer system to protect the contents on said back-up HDD, and when said switch is switched to said "B" position after a malfunction of said working HDD, said back-up HDD is connected with said computer system and used as a substitute working HDD while said working HDD is repaired or replaced without interruption to the normal operation of said computer system;
   f. said control circuit further comprising means for controlling a copy process which copies contents of a selected HDD to a non-selected HDD; and
   g. a copy button also connected to said controller board for initiate said copy process, which may be performed initially after installation of said controller board and said back-up HDD to create an image back-up of all contents of said working HDD in said back-up HDD, or periodically during normal operation of said computer system to completely, incrementally or selectively update the contents of said back-up HDD such that they are concurrent with those of said working HDD, or after repairing or replacing said working HDD after a HDD failure to restore the contents of said working HDD from said back-up HDD.

2. The apparatus in accordance with claim 1, wherein said controller board further comprises a status register connected to said computer system and said controller circuit of said controller board.

3. The apparatus in accordance with claim 1, wherein said control circuit of said controller board further comprises a sequencer means for accelerate said copying process.

4. The apparatus in accordance with claim 1, further comprising at least one status indicator connected to said controller board for indicating the status of said working HDD and said back-up HDD.

5. The apparatus in accordance with claim 1, wherein said controller board further comprises an on-board central processing unit (CPU) electronically coupled with said controller circuit for controlling the functions of said controller board.

6. The apparatus in accordance with claim 5, said controller board further comprises a data buffer electronically coupled with said computer system and said CPU.

7. The apparatus in accordance with claim 6, said controller board further comprises a random access memory device electronically coupled with said CPU and said data buffer.

8. The apparatus in accordance with claim 6, said controller board further comprises a read-only memory device electronically coupled with said CPU and said data buffer.

9. The apparatus in accordance with claim 1, wherein said back-up HDD is a separate logic drive on said working HDD.

10. The apparatus in accordance with claim 1, wherein said controller board is a built-in component of said back-up HDD.

11. The apparatus in accordance with claim 1, wherein said working HDD and said back-up HDD are separate logic drives on a single HDD and said controller board is a built-in component of the single HDD.

12. A method of hard disk drive (HDD) protection and recovery, comprising the steps of:
   a. installing a controller board in a computer system which has a working HDD and electronically coupling the controller board with the working HDD;
   b. installing a back-up HDD and electronically coupling the back-up HDD with said controlled board;
   c. providing a hardware switch connected to said controller board and switchable between an "A" position for selecting said working HDD and a "B" position for selecting said back-up HDD, such that when said switch is switched to said "A" position, said working HDD is connected with said computer system while said back-up HDD is isolated from said computer system to protect the contents on said back-up HDD, and when said switch is switched to said "B" position after a malfunction of said working HDD, said back-up HDD is connected with said computer system and used as a substitute working HDD while said working HDD is repaired or replaced without interruption to the normal operation of said computer system;
   d. providing a copy button connected to said controller board for initiating a copy process which copies contents of a selected HDD to a non-selected HDD;
   e. making an initial back-up by pressing said copy button after installation of said controller board and said back-up HDD, while said switch is switched to said "A" position, to create an image back-up of all contents of said working HDD in said back-up HDD;
   f. making periodic back-ups by pressing said copy button during normal operation of said computer system to completely, incrementally or selectively update the contents of said back-up HDD such that they are concurrent with those of said working HDD, g. switching said switch to said "B" position after a malfunction of said working HDD, to connect said back-up HDD with said computer system such that it is used as a substitute working HDD while said working HDD is repaired or replaced without interruption to the normal operation of said computer system;

h. restoring the contents of said working HDD from said back-up HDD, after said working HDD is repaired or replaced, by pressing said copy button while said switch is switched to said "B" position, to completely or selectively copy the contents of said back-up HDD to said working HDD.

13. The method in accordance with claim 12, further comprising the step of switching said switch back to said "A" position after said restoring step, to connect said working HDD with said computer system such that it is again used for normal operations of said computer system.

14. A method of hard disk drive (HDD) protection and recovery, comprising the steps of:

a. installing a controller board in a computer system which has a working HDD and electronically coupling the controller board with the working HDD;

b. installing a back-up HDD and electronically coupling the back-up HDD with said controlled board;

c. providing a hardware switch connected to said controller board and switchable between an "A" position for selecting said working HDD and a "B" position for selecting said back-up HDD, such that when said switch is switched to said "A" position, said working HDD is connected with said computer system while said back-up HDD is isolated from said computer system to protect the contents on said back-up HDD, and when said switch is switched to said "B" position after a malfunction of said working HDD, said back-up HDD is connected with said computer system and used as a substitute working HDD while said working HDD is repaired or replaced without interruption to the normal operation of said computer system; and d. providing a copy button connected to said controller board for initiating a copy process which copies contents of a selected HDD to a non-selected HDD.

15. The method in accordance with claim 14, further comprising the step of making an initial back-up by pressing said copy button after installation of said controller board and said back-up HDD, while said switch is switched to said "A" position, to create an image back-up of all contents of said working HDD in said back-up HDD.

16. The method in accordance with claim 14, further comprising the step of making periodic back-ups by pressing said copy button during normal operation of said computer system to completely, incrementally or selectively update the contents of said back-up HDD such that they are concurrent with those of said working HDD.

17. The method in accordance with claim 14, further comprising the step of switching said switch to said "B" position after a malfunction of said working HDD, to connect said back-up HDD with said computer system such that it is used as a substitute working HDD while said working HDD is repaired or replaced without interruption to the normal operation of said computer system.

18. The method in accordance with claim 12, further comprising the step of completely or selectively copying the contents of said back-up HDD back to said working HDD after said working HDD is repaired or replaced, by pressing said copy button while said switch is switched to said "B" position.

19. An apparatus for hard disk drive (HDD) protection and recovery used in conjunction with a computer system having a motherboard and a working HDD, comprising:

a. control means for implementing a control logic on said motherboard of said computer system and electronically coupled with said working HDD;

b. a back-up HDD electronically coupled with said control means;

c. a hardware switch connected to said control means and switchable between an "A" position for selecting said working HDD and a "B" position for selecting said back-up HDD;

d. said control means having a switching circuit for controlling data transfer between said computer system and said working and back-up HDDs;

e. said control means also having a control circuit for controlling said switching circuit, such that when said switch is switched to said "A" position, said working HDD is connected with said computer system while said back-up HDD is isolated from said computer system to protect the contents on said back-up HDD, and when said switch is switched to said "B" position after a malfunction of said working HDD, said back-up HDD is connected with said computer system and used as a substitute working HDD while said working HDD is repaired or replaced without interruption to the normal operation of said computer system;

f. said control circuit further comprising means for controlling a copy process which copies contents of a selected HDD to a non-selected HDD; and g. a copy button also connected to said control means for initiate said copy process, which may be performed initially after installation of said controller board and said back-up HDD to create an image back-up of all contents of said working HDD in said back-up HDD, or periodically during normal operation of said computer system to completely, incrementally or selectively update the contents of said back-up HDD such that they are concurrent with those of said working HDD, or after repairing or replacing said working HDD after a HDD failure to restore the contents of said working HDD from said back-up HDD.

20. The apparatus in accordance with claim 19, wherein said back-up HDD is a separate logic drive on said working HDD.

21. The apparatus in accordance with claim 19, further comprising an least one status indicator connected to said control means for indicating the status of said working HDD and said back-up HDD.

22. An apparatus for hard disk drive (HDD) protection and recovery used in conjunction with a computer system having a working HDD, comprising:

a. control means for implementing a control logic on said working HDD and electronically coupled with said computer system;

b. a back-up HDD electronically coupled with said control means;

c. a hardware switch connected to said control means and switchable between an "A" position for selecting said working HDD and a "B" position for selecting said back-up HDD;

d. said control means having a switching circuit for controlling data transfer between said computer system and said working and back-up HDDs;

e. said control means also having a control circuit for controlling said switching circuit, such that when said switch is switched to said "A" position, said working HDD is connected with said computer system while said back-up HDD is isolated from said computer system to protect the contents on said back-up HDD, and when said switch is switched to said "B" position after a malfunction of said working HDD, said back-up HDD is connected with said computer system and used as a substitute working HDD while said working HDD is repaired or replaced without interruption to the normal operation of said computer system;

f. said control circuit further comprising means for controlling a copy process which copies contents of a selected HDD to a non-selected HDD; and g. a copy button also connected to said control means for initiate said copy process, which may be performed initially after installation of said controller board and said back-up HDD to create an image back-up of all contents of said working HDD in said back-up HDD, or periodically during normal operation of said computer system to completely, incrementally or selectively update the contents of said back-up HDD such that they are concurrent with those of said working HDD, or after repairing or replacing said working HDD after a HDD failure to restore the contents of said working HDD from said back-up HDD.

23. The apparatus in accordance with claim 22, further comprising an least one status indicator connected to said control means for indicating the status of said working HDD and said back-up HDD.

24. An apparatus for hard disk drive (HDD) protection and recovery used in conjunction with a computer system having a working HDD, comprising:

a. a back-up HDD control means for implementing a control logic and electronically coupled with said computer system;

b. a hardware switch connected to said control means and switchable between an "A" position for selecting said working HDD and a "B" position for selecting said back-up HDD;

c. said control means having a switching circuit for controlling data transfer between said computer system and said working and back-up HDDs;

d. said control means also having a control circuit for controlling said switching circuit, such that when said switch is switched to said "A" position, said working HDD is connected with said computer system while said back-up HDD is isolated from said computer system to protect the contents on said back-up HDD, and when said switch is switched to said "B" position after a malfunction of said working HDD, said back-up HDD is connected with said computer system and used as a substitute working HDD while said working HDD is repaired or replaced without interruption to the normal operation of said computer system;

e. said control circuit further comprising means for controlling a copy process which copies contents of a selected HDD to a non-selected HDD; and f. a copy button also connected to said control means for initiate said copy process, which may be performed initially after installation of said controller board and said back-up HDD to create an image back-up of all contents of said working HDD in said back-up HDD, or periodically during normal operation of said computer system to completely, incrementally or selectively update the contents of said back-up HDD such that they are concurrent with those of said working HDD, or after repairing or replacing said working HDD after a HDD failure to restore the contents of said working HDD from said back-up HDD.

25. The apparatus in accordance with claim 24, further comprising an least one status indicator connected to said control means for indicating the status of said working HDD and said back-up HDD.

* * * * *